May 15, 1956 — H. R. HEINTZEN — 2,745,382
POWER PISTON CYLINDER ASSEMBLY
Filed July 14, 1954
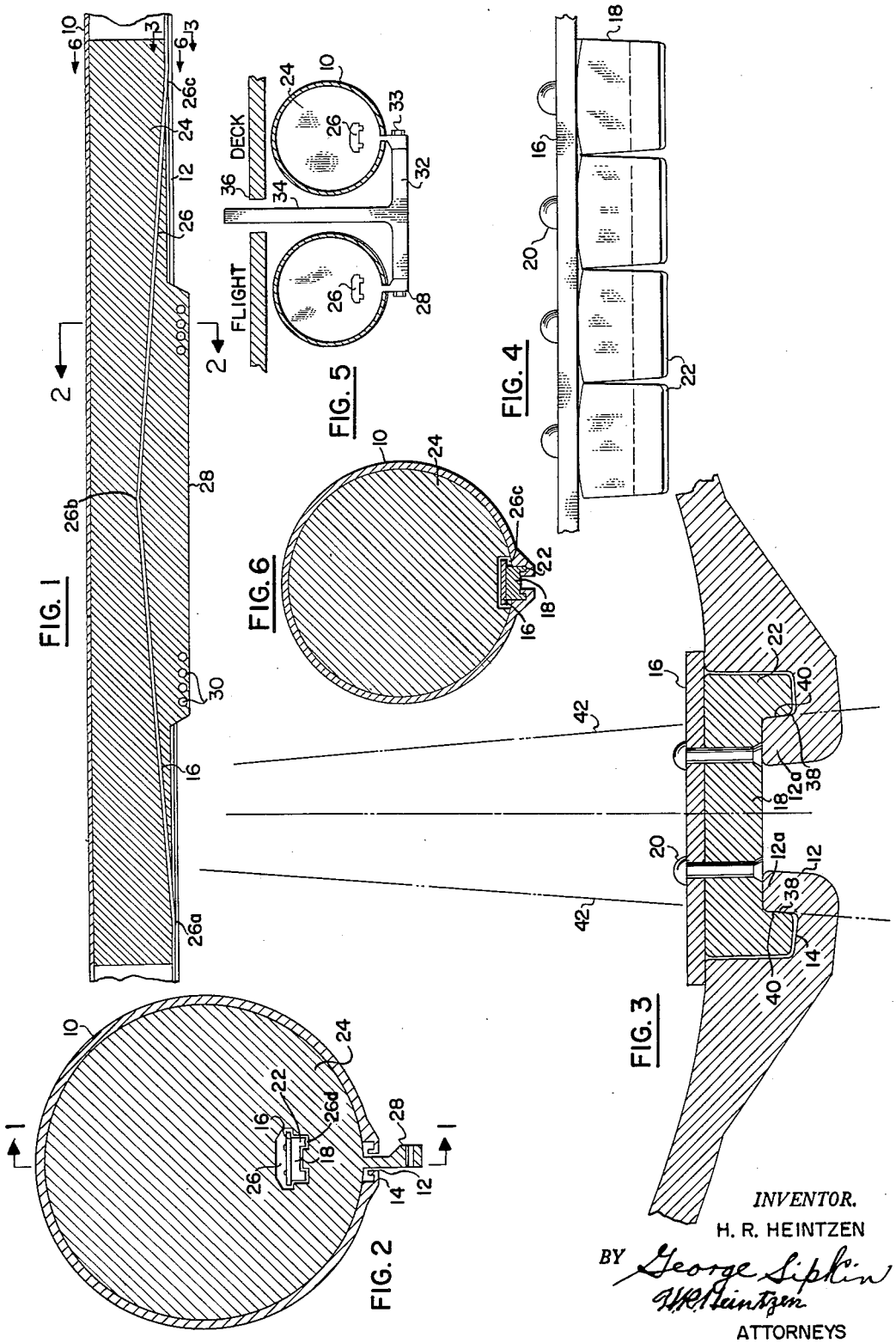
INVENTOR.
H. R. HEINTZEN
BY George Sipkin
H. R. Heintzen
ATTORNEYS

# United States Patent Office 2,745,382
Patented May 15, 1956

2,745,382

POWER PISTON CYLINDER ASSEMBLY

Harry R. Heintzen, Philadelphia, Pa.

Application July 14, 1954, Serial No. 443,446

2 Claims. (Cl. 121—1)

(Granted under Title 35, U. S. Code (1952), sec. 266)

The invention described herein may be manufactured and used by or for the Government of the United States of America for governmental purposes without the payment of any royalties thereon or therefor.

This invention relates to power cylinders and pistons in which the thrust of the piston is transmitted to the actuated elements through a longitudinal slit in the side of the cylinder. Such power elements are commonly used when the cylinder is so long that the use of a conventional piston rod is impractical. One application of such power elements is in steam actuated catapults for launching aircraft from air plane carrier ships.

It is an object of this invention to provide a light weight power cylinder and piston of the type described.

It is another object of the invention to provide novel means for retaining a locking and sealing strip in place on the slit of a power cylinder.

It is a further object of the invention to provide an effective sealing strip for the longitudinal slit in a steam power cylinder.

Other objects and advantages of the invention will hereinafter become more fully apparent from the following description of the annexed drawings, which illustrate a preferred embodiment, and wherein:

Fig. 1 is a sectional view in elevation of the power elements of this invention and is taken on the line 1—1 of Fig. 2;

Fig. 2 is a sectional view taken on the line 2—2 of Fig. 1;

Fig. 3 is an enlarged view taken on the line 3—3 of Fig. 1;

Fig. 4 is an enlarged view in elevation of the sealing and locking strip of Fig. 3; and Fig. 5 is a view in elevation and partly in section showing two power elements of this invention located below the flight deck of an air plane carrier ship.

Fig. 6 is a view taken along the line 6—6 of Fig. 1.

Referring now to the drawings for a description of the invention, the reference numeral 10 designates a cylinder having a longitudinal slit 12 in its lowermost portion. The cylinder 10 is shown as lying in a horizontal position but may lie in any position up to 70° from the horizontal. The edges of the cylinder 10 adjacent the slit 12 are provided with flanges 12a and form grooves 14 as shown in Fig. 3. A sealing strip 16 overlies the slit 12 to seal it against the escape of fluid pressure from the interior of the cylinder 10. A plurality of locking members 18 are secured by rivets 20 to the sealing strip 16. The locking members 18 are provided with downwardly extending projections 22 at their ends which projections 22 normally lie in the grooves 14 to prevent spreading of the slit 12 when the cylinder 10 is under fluid pressure.

A piston 24 is mounted for reciprocatory movement within the cylinder 10 and has a passageway 26 through a portion thereof. The passageway 26 extends at an angle upwardly from groove 26a in the bottom wall portion of the piston to a mid point 26b from which it extends downwardly at an angle and terminates at groove 26c. The sealing strip 16 and the portion of the piston below the passageway 26 seals slit 12 as the piston is reciprocated. The strip assembly is removed from sealing engagement with the slit in either direction of movement of the piston and the lower flange 28 and lower wall of the piston generally seals portions of the slit that are not covered by the strip assembly. As shown in Fig. 2, the passageway 26 may be provided with groovular portions 26d which extend along the passageway 26 and receive the projections 22 on locking members 18. The strip 16 will have substantial resiliency and the locking members 18 will be independent and spaced to provide the desired degree of flexibility to permit movement of the piston 24 relative to the strip assembly. Openings 30 are provided in the flange 28 for receiving elements which are to be actuated by the reciprocatory movement of the piston 24.

It will be apparent from the above that if a fluid under pressure is applied to the cylinder 10 at one end of the piston 24, it will be forced along the cylinder 10 by the fluid and will raise the sealing strip 16 and locking members 18 so that the flange 28 may project through portions of the slit 12 below the piston 24. Gravity holds the sealing strip 16 and the locking members 18 in position on the slit 12 when the cylinder is not under pressure. If the piston 24 and cylinder 10 of this invention are actuated by steam under pressure, the sealing effect of the sealing strip 16 is enhanced by the water formed by the condensation of the steam as it strikes the cold surfaces of the cylinder 10. The water runs down on the sides of the cylinder 10 and on the sealing strip 16 thereby retarding the escape of live steam around the strip 16.

The locking members 18 are preferably rounded at their upper surfaces as shown in Fig. 4 and are spaced apart or tapered so that the sealing strip 16 can flex uniformly with the concave side downwardly as it passes through the center of the piston 24. The meeting faces 38 and 40 of the groove 14 and of the projection 22, respectively, preferably lie in planes 42 which pass through the axis of the cylinder 10 so that the meeting faces 38 and 40 readily engage when the locking members 18 are lowered into position by the passage of the piston 24. The faces 38 and 40 may also lie in planes which lie at a more acute angle with one another than the planes 42.

Fig. 5 shows the application of the power elements of this invention to an air craft catapult on an air plane carrier ship. A T-shaped yoke 32 is secured by bolts 3 to the flanges 28 of two power elements such as described. The trunk 34 of the T-shaped yoke 32 extends through a slot 36 in the flight deck of the carrier. The air craft to be catapulted may be hooked (by means not shown) to the trunk 34 of the T-shaped yoke 32 to be catapulted along the flight deck under the action of the power elements 10 and 24. The dual arrangement of the cylinders 10 compensates for the side thrust of the two pistons 24 and centers the trunk 34 in the slot 36.

In Fig. 6 is shown the relation of the grooves 26a and 26c with the passageway 26 and the position of the strip assembly comprising the lugs 18 and the sealing strip 16 therewith. From an inspection of this Fig. 6 and also Figs. 1 and 2, it will be seen that the passageway 26 declines from its mid point 26b and merges with groove 26c (and also with groove 26a, although not shown). The grooves extend from the lines of mergence with the passageway toward the ends of the piston.

It will be apparent from the above that this invention provides a light weight slit cylinder and piston power element in which the locking elements for the slit are held in place by gravity when the power cylinder is not under internal fluid pressure and in which the condensate from the operating vapor enhances the sealing effect of the sealing strip.

Obviously many modifications and variations of the present invention are possible in the light of the above teachings. It is therefore to be understood that within the scope of the appended claims the invention may be practiced otherwise than as specifically described.

What is claimed is:

1. A piston-cylinder assembly comprising an elongated cylinder having a longitudinal slot in the bottom wall between its end portions, said slot having inwardly extending flanges providing a longitudinal guideway adjacent and on either side of said slot, a piston mounted for reciprocation within said cylinder, a continuous longitudinal passageway extending through said piston between its end portions, said passageway extending from a zone within the body of the piston toward and communicating with the spaced openings in the bottom of the piston, an elongate flexible sealing strip within said passageway, said piston and sealing strip cooperating to cover the slot in the cylinder during movement of the piston relative to the cylinder, locking members for the cylinder comprising projections secured to and depending from said sealing strip, said projections being aligned in longitudinal rows and each row providing a flexible articulated guide for reception within one of the longitudinal guideways of the cylinder upon relative movement of the piston and cylinder.

2. Claim 1 further characterized by the longitudinal grooves in the cylinder having their inner faces engaged under compression by the cooperating inner faces of the longitudinal rows of projections of the locking members to prevent distortion of the cylinder when the piston is moved therein under pressure.

References Cited in the file of this patent

UNITED STATES PATENTS 2,485,601  Hickman _____ Oct. 25, 1949

FOREIGN PATENTS 669,248  Great Britain _____ Apr. 2, 1952